United States Patent
Carpenter

[15] 3,695,394
[45] Oct. 3, 1972

[54] LOCKING WHEEL CHOCKS FOR TANDEM WHEEL VEHICLES

[72] Inventor: Walter C. Carpenter, 14900 E. 40th St., Independence, Mo. 64055

[22] Filed: Oct. 8, 1970

[21] Appl. No.: 79,169

[52] U.S. Cl. ................................. 188/32
[51] Int. Cl. ............................... B60t 3/00
[58] Field of Search ..................... 188/32, 36

[56] References Cited

UNITED STATES PATENTS

| | | | |
|---|---|---|---|
| 1,174,410 | 3/1916 | Hajasok et al. | 188/32 |
| 3,318,419 | 5/1967 | Chastain | 188/32 |
| 3,537,548 | 11/1970 | Jeppesen | 188/32 |
| 3,547,228 | 12/1970 | Wiley | 188/32 |

Primary Examiner—Duane A. Reger
Attorney—John A. Hamilton

[57] ABSTRACT

Wheel chocks for a tandem wheel vehicle consisting of a pair of oppositely directed wedges adapted to be positioned between a set of tandem wheels, each wedge being adapted to be driven between the road surface and one of said wheels, an adjustable turnbuckle extending between and interconnecting said wedges, and a chain and padlock operable both to secure said chocks to the vehicle and to prevent operation of said turnbuckle.

1 Claim, 6 Drawing Figures

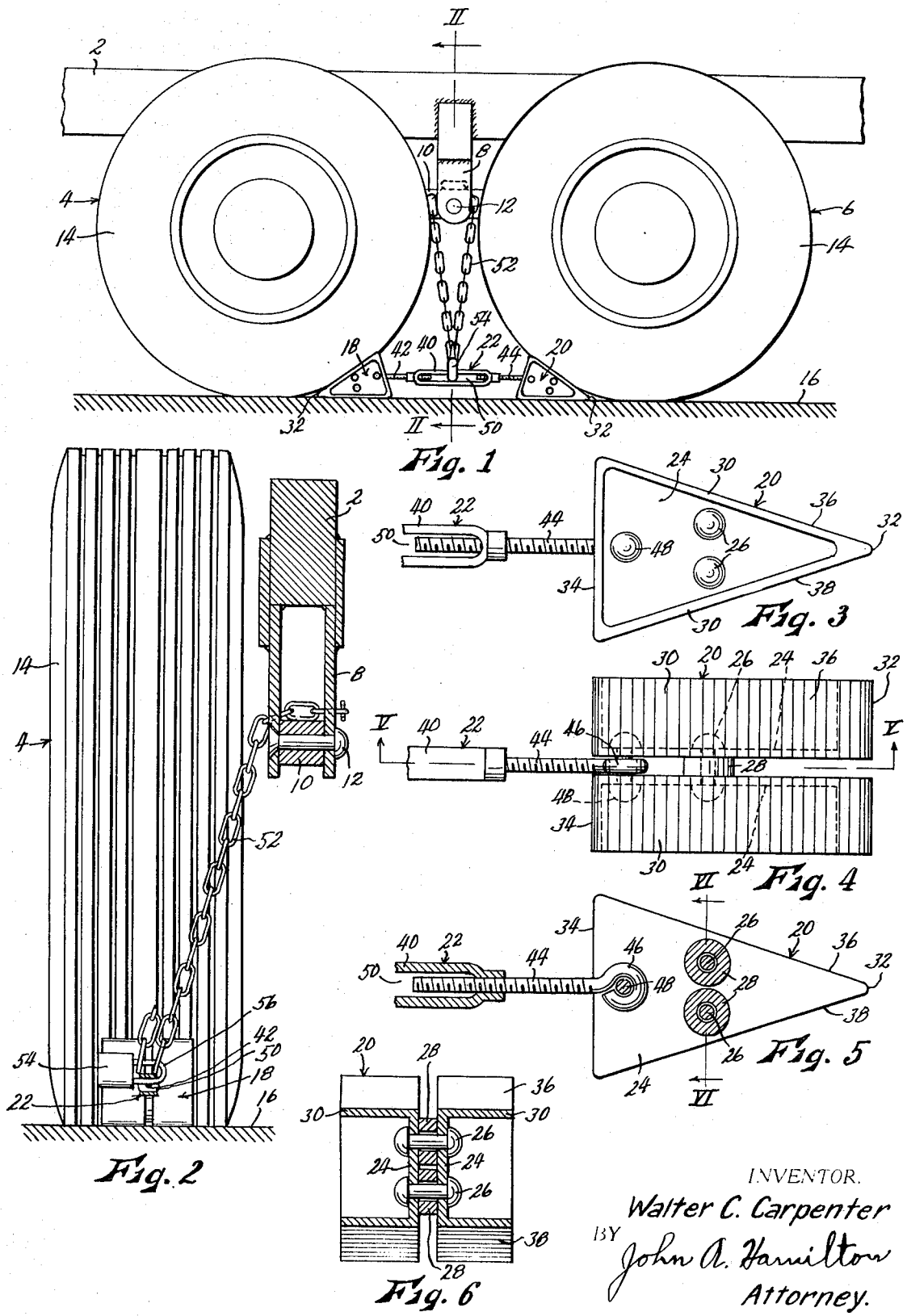

LOCKING WHEEL CHOCKS FOR TANDEM WHEEL VEHICLES

This invention relates to new and useful improvements in wheel chocks for automotive vehicles, and has particular reference to a set of wheel chocks especially adapted for use in connection with vehicles having tandem-mounted wheels, that is, pairs of wheels mounted in closely spaced fore-and-aft relation at either side of the vehicle. Tandem-mounted wheels are found most commonly on heavy vehicles such as trucks, trailers, and the like, and in the present case the chocks have been developed primarily for use in connection with house trailers, camper trailers, and the like, although as will be apparent they have application to automotive vehicles in general. Many vehicles must be chocked when they are parked, to prevent accidental rolling thereof on sloping surfaces, especially trailers where they disconnected from their towing vehicles, since many trailers are equipped with hydraulic brakes powered by the towing vehicle. Presently, the chocking is often accomplished by the use of makeshift material such as bricks, boards, rocks, and the like available at the site, wedged under the wheels. Such makeshift articles as may be available, however, may be adequate, or improperly shaped, with a resultant unsafe condition.

Accordingly, the principal object of the present invention is the provision of a set of wheel chocks which will effectively prevent rolling motion of a tandem-wheeled vehicle either forwardly or rearwardly, and which to this end constitutes a pair of oppositely directed wedges joined by an elongated connector, said wedges being adapted to be disposed between a pair of tandem wheels, in the plane thereof, each wedge being inserted between the ground surface and one of said wheels.

Another object is the provision of a set of wheel chocks of the character described wherein the connector between the wedges is adjustably extensible in length, whereby said wedges may be forcibly separated to move them into indenting relation to the tires of the wheels. In this manner, it is rendered extremely difficult to dislodge the wedges without first shortening the connector.

A further object is the provision of a set of wheel chocks of the character described having locking means operable both to secure the chocks to the vehicle, and to prevent adjustment of the connector between the wedges.

A still further object is the provision of a set of wheel chocks of the character described wherein the wedges are joined to the connector in such a manner that they are relatively movable to accommodate themselves to uneven ground surfaces.

Other objects are simplicity and economy of construction and efficiency and dependability of operation.

With these objects in view, as well as other objects which will appear in the course of the specification, reference will be had to the accompanying drawing, wherein:

FIG. 1 is a fragmentary side elevational view of a vehicle frame including a pair of tandem-mounted ground-engaging wheels, and showing a set of wheel chocks embodying the present invention applied operatively thereto, FIG. 2 is an enlarged sectional view taken on line II—II of FIG. 1, FIG. 3 is an enlarged fragmentary side elevational view of the chocks, showing one of the wedges and a portion of the turnbuckle connector, FIG. 4 is a top plan view of the parts as shown in FIG. 3, FIG. 5 is a sectional view taken on line V—V of FIG. 4, and FIG. 6 is a sectional view taken on line VI—VI of FIG. 5.

Like reference numerals apply to similar parts throughout the several views and the numeral 2 applies to the frame of an automotive vehicle such as a camper trailer, having a pair of ground-engaging wheels 4 and 6 mounted in tandem relation, that is, in closely spaced apart fore-and-aft relation in the same vertical plane. Said wheels are mounted on frame 2 by means well known in the art and not here shown in detail, but including a bracket 8 welded to and depending from frame 2 intermediate the wheels. An equalizer bar 10 is pivoted intermediate its ends to the lower end of bracket 8 by rivet 12, and extends fore and aft therefrom, forming a support for the contiguous ends of leaf springs (not shown) by which wheels 4 and 6 are supported. Each of the wheels is provided with the usual tire 14, which engage ground or roadway surface 16.

The chock set forming the subject matter of the present invention includes a pair of wedges 18 and 20 and an elongated connector 22 extending between and joining said wedges. As best shown in FIGS. 3-6, each wedge 18 and 20 includes a pair of parallel, vertical triangular walls 24 rigidly connected together by rivets 26, and spaced apart by washer like bushings 28 mounted on said rivets therebetween. Each plate 24 is provided with an integral peripheral flange 30 extending normally outwardly therefrom, said flanges forming the faces of the wedge. Each wedge has the form of an isosceles triangle, with the smaller angle defining the apex 32 of the wedge; with the face 34 of the wedge opposite the apex being designated its base. The faces 36 and 38 of the wedge intersecting at apex 32 are the operative faces of the wedge. Wall 24 and flanges 30 are preferably formed of cast iron or the like.

Connector 22 constitutes a turnbuckle, or "shackle screw," including an elongated nut 40 threaded axially at each end and a pair of screws 42 and 44 threaded into the respectively opposite ends of said nut. Said screws have respectively left-hand and right-hand threads, and extend outwardly in opposite directions from said nut, their outer ends projecting between the walls 24 of wedges 18 and 20 respectively, at the base ends 34 of said wedges. Between said walls, each screw is formed to present an eye 46 (see Fig. 5) which is pivotally engaged on a rivet 48 extending between and affixed in walls 24. Nut 40 is provided with a central opening 50 extending laterally therethrough intermediate the ends thereof.

In the use of the chock set, turnbuckle connector 22 is first shortened by turning nut 40 in one direction until wedges 18 and 20 are sufficiently close together that they may be inserted easily between the tandem-mounted vehicle wheels 4 and 6 as shown in Fig. 1, that is, with turnbuckle 22 extending fore and aft, with the wedges resting on road surface 16, and with the apeces 32 of the wedges extending fore and aft to project between road surface 16 and the tires 14 of the respective wheels. Then nut 40 of the turnbuckle is turned in the opposite direction to move the wedges farther apart, wedging them beneath the tires with sufficient force to cause them to indent said tires. Thus the vehicle is positively prevented from rolling either forwardly or rearwardly. Since each wedge is free to turn rotatably about the axis of connector 22, by reason of the turning of screws 42 and 44 in nut 40, and since each wedge can pivot vertically relative to the connector on its rivet 48, the wedges accommodate themselves readily to rough and uneven ground and road surfaces. Said wedges in effect have a universally pivoted swivel connection to nut 40.

If the wedges are expanded with sufficient force to indent the tires to some degree, it becomes extremely difficult to dislodge said wedges by any means other than by turning nut 40 to retract the wedges, short of actually lifting the entire vehicle off of the wedges with jacks. That is, the wedges are extremely difficult to dislodge by pushing, hammering, or the like. Moreover, if the angle between operative faces 36 and 38 of the wedges is sufficiently great (about 35° has been found adequate for the purpose), it becomes almost impossible to pull or drive the vehicle off of the wedges, even if wheels 4 or 6 should be drive wheels powered by the vehicle engine. Therefore, if some means is provided to prevent unauthorized turning of nut 40, the chocks become a reasonably efficient means for preventing theft of the vehicle, or at least to render any such theft difficult. This is very important in the case of vehicles of the trailer type, which often have no other theft prevention locking means, and which often must be left unattended. As shown, the locking means includes a linked chain 52 and a padlock 54, said chain being passed about some rigid portion of vehicle frame 2, such as wheel mounting bracket 8, and its end links brought together adjacent nut 40, the hasp 56 of padlock 54 being passed through both of said end links, and through central transverse opening 50 of nut 40. Thus 40 cannot be turned until the padlock is unlocked and removed.

While I have shown and described a specific embodiment of my invention, it will be readily apparent that many minor changes of structure and operation could be made without departing from the spirit of the invention.

What I claim as new and desire to protect by Letters Patent is:

1. Wheel chocks for vehicles having tandem-mounted, ground-engaging wheels comprising:
    a. a pair of wedges adapted to be disposed between a pair of tanden related wheels, in the vertical plane thereof, with their apeces directed respectively forwardly and rearwardly, whereby to wedge respectively between the road surface and the peripheries of each of said wheels,
    b. an elongated, longitudinally incompressible connector extending between and attached at its respective ends to said wedges, and comprising a pair of oppositely threaded screws each pivoted to one of said wedges for movement in a plane normal to the operative faces of said wedge, and an elongated nut disposed coaxially with said screws, said screws being rotatably threaded into the opposite ends of said nut, said nut having an opening formed transversely therethrough intermediate its ends, and
    c. locking means operable to lock said connector releasably at any desired degree of extension, and to secure said wedges and said connector to said vehicle, said locking means comprising a linked chain adapted to be looped about a rigidly fixed portion of said vehicle and its end links brought together adjacent said nut, and a padlock having a hasp adapted to be threaded through said end links and the transverse opening of said nut.

* * * * *